United States Patent [19]

Munz

[11] Patent Number: 4,632,356

[45] Date of Patent: Dec. 30, 1986

[54] VERTICALLY ADJUSTABLE SHOCK-ABSORBING MOUNTING DEVICE

[76] Inventor: Erich Munz, Weststrasse 11, D - 5204 Lohmar 1 - Geber, Fed. Rep. of Germany

[21] Appl. No.: 722,835

[22] Filed: Apr. 12, 1985

[30] Foreign Application Priority Data

Apr. 19, 1984 [DE] Fed. Rep. of Germany ....... 3414888
Dec. 5, 1984 [DE] Fed. Rep. of Germany ....... 3444237

[51] Int. Cl.⁴ .............................................. F16M 3/00
[52] U.S. Cl. .................................... 248/638; 248/650; 248/188.4
[58] Field of Search ............... 248/638, 650, 677, 637, 248/686, 678, 188.4, 615, 676; 267/152, 153

[56] References Cited

U.S. PATENT DOCUMENTS

| | | | |
|---|---|---|---|
| 3,351,309 | 11/1967 | Harrison | 248/650 X |
| 3,358,951 | 12/1967 | Carter | 248/650 |
| 3,592,423 | 7/1971 | Mui | 248/188.4 X |
| 3,730,463 | 5/1973 | Richard | 248/677 X |
| 3,815,852 | 6/1974 | May | 248/677 X |
| 3,889,907 | 6/1975 | DeSourdis | 248/615 X |
| 3,895,408 | 7/1975 | Leingang | 267/153 X |
| 4,117,997 | 10/1978 | Gitzendanner | 248/678 X |

*Primary Examiner*—Ramon O. Ramirez
*Attorney, Agent, or Firm*—Kurt Kelman

[57] ABSTRACT

A vertically adjustable, shock-absorbing mounting device for supporting an object comprises a foundation body including a metallic cover plate, and a support plate having an underside and a supporting surface for the object. The support plate includes a ledge protruding from the support at no more than two adjoining sides of the support plate for engaging and retaining the object on the supporting surface against rotation in relation thereto. A threaded spindle has an upper end connected with the underside of the support plate and a lower end connected with the cover plate, one of the spindle ends being in threaded connection and the other spindle end being in locking connection with the respective plate whereby rotation of the threaded spindle adjusts the spacing between the foundation and the support plate while the object is held against rotation by the retaining engagement with the ledge.

14 Claims, 15 Drawing Figures

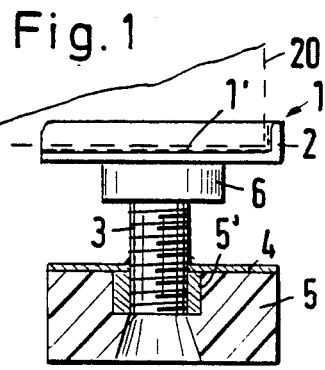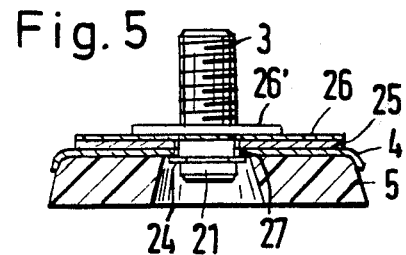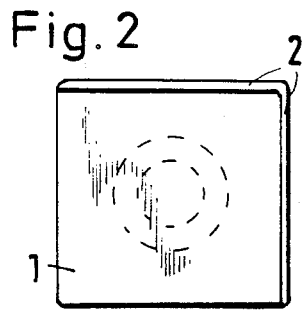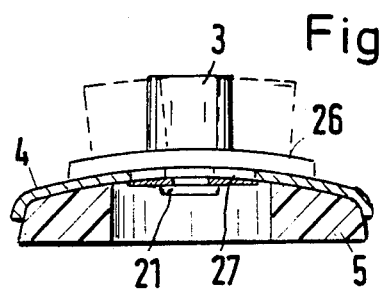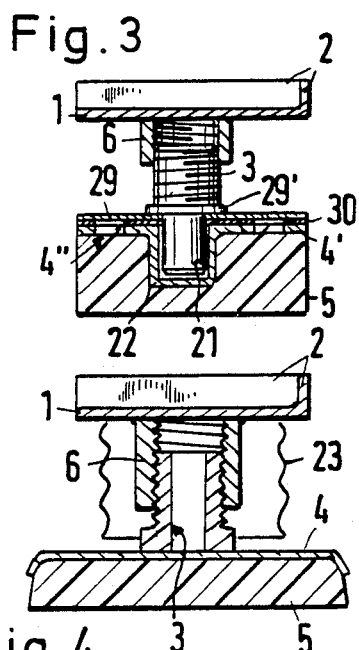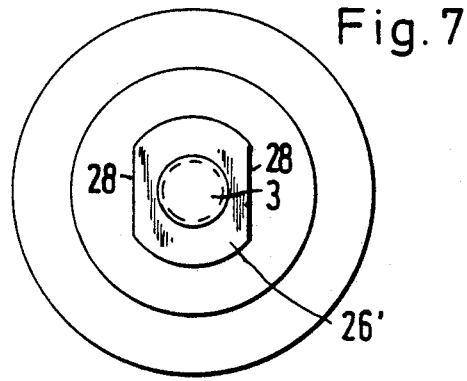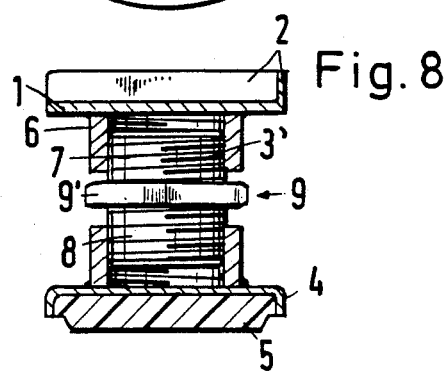

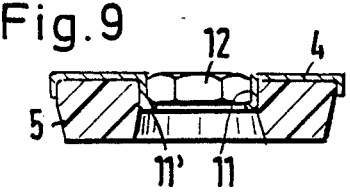
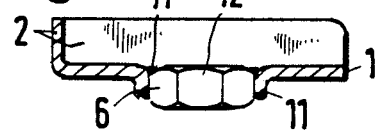
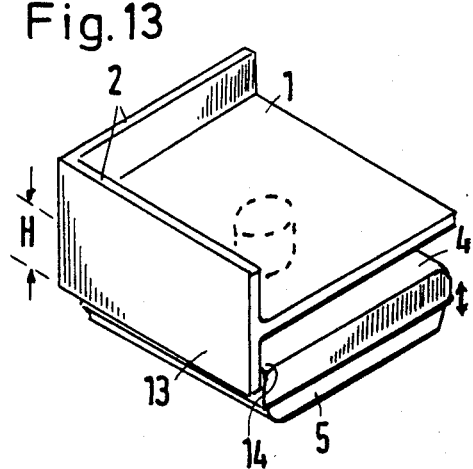
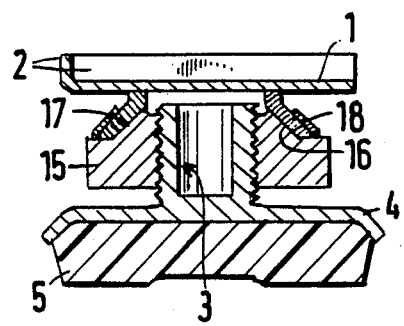
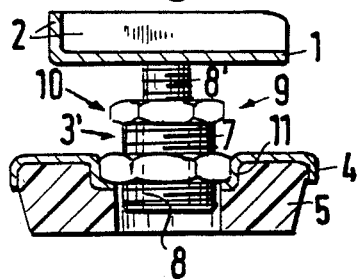
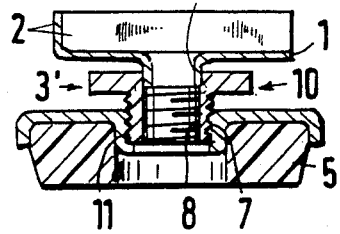
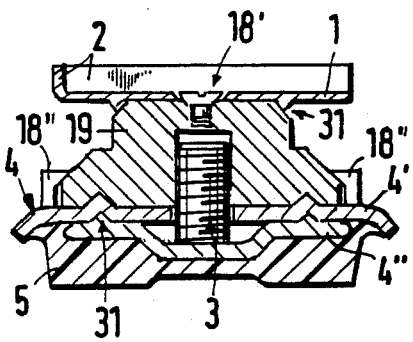

VERTICALLY ADJUSTABLE SHOCK-ABSORBING MOUNTING DEVICE

The invention concerns a vertically adjustable, shock-absorbing mounting device.

U.S. Pat. No. 3,592,423 discloses such a device in which a threaded spindle (a normal machine bolt) can, for the purpose of making levelling adjustments, be screwed into a support plate, with its lower end bearing against the cover plate of a resilient solid base under the weight of a object resting upon a supplementary support plate on the device. To do this, the particular object which is intended to be mounted must be provided with a suitable drilled hole in the appropriate part of its base plate, and the support plate must be provided with a hole drilled through it having an internal screw thread. Since devices of this kind are, as a rule, used as supports for vibrating objects, it is necessary to provide the threaded spindle with a counter nut and intermediary washers in order to be able to tighten the spindle and the support plate firmly against the edge of the base plate of the object, since otherwise the whole device can be misaligned under the effects of continuous vibration. This previously known device therefore requires a special design of the area used for emplacing the object concerned in order to make use of it as a support. To make adjustments to the spindle, the counter nut has to be loosened and then tightened. In addition to that, in relation to the bell-shaped support plate, the resilient solid base with its cover plate has to be guided into the support base somewhat like a piston.

It is accordingly an object of the invention to improve on shock-absorbing mounting devices of the kind mentioned above in such a way that it is possible to do without counter nuts special connection features of any kind, such as the drilling of holes or the provision of connector-engaging recesses in the area of the supporting surface or in the area of the base plate of the object to be supported on the device.

The above object is accomplished in accordance with the invention with a mounting device which comprises a foundation body including a metallic cover plate, a support plate having an underside and a supporting surface for the object, the support plate including a ledge protruding from the support surface at no more than two adjoining sides of the support plate for engaging and retaining the object on the supporting surface against rotation in relation thereto, and a threaded spindle having an upper end connected with the underside of the support plate and a lower end connected with the cover plate, one of the spindle ends being in threaded connection and the other spindle end being in locking connection with the respective plate whereby rotation of the threaded spindle adjusts the spacing between the foundation and the support plate while the object is held against rotation by the retaining engagement with the ledge.

The term "locking connection" means that the spindle end is connected to the cover plate of the foundation so that the spindle and the cover plate cannot rotate in relation to each other. The spindle end may pass through the cover plate into the foundation. The essential feature is the locking connection and the ability of the support plate and the foundation to be vertically adjustable in relation to each other when the object rests on the support plate.

The device of the invention thus advantageously enables a supported object merely to be placed thereon while being adjustable. With respect to the essential feature of the device the invention, that the support plate is designed to be provided with an object-retaining ledge on its upper side, a typical one being an angled retaining strip, a support plate design with such a ledge on its upper side is, to be sure, also known from German Pat. No. 25 06 836; however, this feature has an added importance in the present context, which will be explained in greater detail later, aside from the fact that, in the present case, the support plate itself is not now provided with a resilient base, as is the case with respect to the German Patent. By reason of the special design of the support plate with an object-retaining ledge, the support plate can no longer rotate with respect to the object's base plate, i.e., the support plate to a certain degree takes over the function of a counter nut, or else no longer requires any fixing into position by means of a counter nut. By this means, too, any necessary vertical levelling adjustment becomes most simple, particularly if the load supported happens to be heavy.

The device of the invention is explained in greater detail below in conjunction with the accompanying schematic drawing illustrating some now preferred embodiments by way of example.

FIG. 1 is a cross-section through the device;

FIG. 2 is a plan view of the device of FIG. 1;

FIGS. 3–6 show cross-sectional views of other embodiments of the device;

FIG. 7 is a plan view of FIG. 5;

FIG. 8 is a cross-section through the device in a further embodiment;

FIG. 9 is a cross-section through the cover plate and solid base in a special embodiment;

FIG. 10 is a cross-sectional view of the support plate in a special embodiment;

FIG. 11 is a cross-section through a further embodiment;

FIG. 12 is a cross-sectional view of a specially compact embodiment, consisting of only three parts;

FIG. 13 is a perspective view of a further special embodiment, and

FIGS. 14 and 15 are cross-sections through two additional embodiments. Referring first to the embodiments shown in of the device.

Referring first to the embodiment shown in FIGS. 1 to 7, FIG. 1 shows that the device consists in principle—and this applies to all embodiments—of the following parts:

A solid base 5 provided with a cover plate 4 and made of more or less firm resilient material (such as rubber or other suitable elastomers), threaded spindle 3 and support plate 1 with an object-retaining ledge 2 on the supporting surface side thereof, which is advantageously designed in the shape of an angled retaining strip, as may be seen in FIGS. 2 and 13. The support plate 1 is provided on its supporting surface side with a thin non-skid coating 1' and has a screw socket 6 on its underside by which means it is screwed onto the threaded spindle 3, which on its part is screwed into interiorly threaded sleeve 5' locked into position in that base in an appropriate manner. The threaded spindle 3 can, however, also be fixed solidly to the support plate 1 at its upper end (the screw socket 6 may then be dispensed with), in which case the threaded spindle 3 must be rotatably seated within threaded sleeve 5'. The corner of an object placed on the support plate is shown by the broken line and designated by the reference number 20. As can be seen in FIGS. 1 and 2, the support plate 1 cannot turn by itself thanks to its retaining ledge 2, which embraces the corner 20 of the object, since it is held in place by the object itself, i.e., the distance from the solid base 5 with its cover plate 4, once set, remains fixed under all circumstances. Since the solid base 5 consists of more or less firmly resilient shock-absorbing material, by way of example, rubber, and therefore is itself skid-resistant, no danger exists that the solid base will turn as a result of any vibrations that may arise. If, for example, the device supporting corner 20 of an object, as illustrated in FIG. 1, should be located in a place where the base seating surface lies somewhat lower, the solid base 5, despite the load carried, can be quite easily turned out of the threaded socket 6 with the threaded spindle 3 to leveling corner. In this turning process the support plate 1 continues to retain its position vis-a-vis the corner 20 thanks to the object-retaining ledge 2.

The embodiment according to FIG. 3 deviates from the one described above in the fact that here the threaded spindle 3 is not fastened directly to the solid base 5 but, instead, to cover plate 4'. The threaded spindle is provided with a concentric bolt 21 which can be inserted into a blind hole type of sleeve 22 in the solid base 5. Plate 4' defines perforations 4" filled with the resilient material projecting from the solid base 5 into the perforations. When a load is applied to support plate 1, its weight is transmitted to the resilient material of the solid base 5 through cover plate 4' causing the resilient material to arch somewhat upward in the area of the perforations 4" whereby intermediate plate 29 is held against skidding or turning with respect to the solid base 5 or the cover plate 4'. In this embodiment it is advantageous to provide a further thin supplementary intermediate layer 30 made of suitable plastic material which, in contrast to the resilient material of the solid base, facilitates a turning of the metallic intermediate plate 29. In the area of the perforations 4" this thin intermediate layer 30 is likewise correspondingly perforated so that the resilient material of the solid base 5 can penetrate through this intermediate layer 30 as well. The intermediate plate 29, which by way of example is provided with a nut attachment 29', can quite easily be turned with a suitable wrench, and thus be adjusted with respect to the support plate 1. Even if no intermediate layer 30 should be present it is possible to make an adjustment by means of a wrench and the application of enough force, while at the same time any self-initiated turning under the effect of vibrations is countered by the braking effect of the "penetrating buffers" of the solid base 5 in the area of perforations 4".

The embodiment according to FIG. 4 corresponds in essence to the embodiment of FIG. 1, with the difference that here the threaded spindle 3 is designed as an externally threaded sleeve, seated on the cover plate 4, onto which is screwed the screw pocket 6. The same also applies to the embodiments of FIGS. 5 and 6.

In order to give the device as a whole a nice outward appearance, and also to provide the screw threads with protection against dirt, a deformable protective sleeve 23 can be attached below the support plate 1, as shown in FIG. 4, a measure made possible with this device by the fact that there is no requirement here for counter nuts of any sort, whose accessibility would be made impossible by such a protective sleeve. A design with the spindle in the shape of a sleeve would, in particular, be provided for those types of devices which have to carry heavy loads.

The embodiment according to FIG. 5 has a certain amount of similarity to that of FIG. 3 in that, here, the threaded spindle 3 is likewise rotatably attached to the cover plate 4 of the solid base 5 and is secured by means of a retaining ring 24. Here, too, the cover plate 4, the intermediate layer 25 and the foot plate 26 of the spindle 3 can be given a design and function as described with respect to FIG. 3. The upper part 26' of the foot plate 26 is shown as having rectilinear parallel edges 28, so that a wrench can be applied to it (FIG. 7).

The embodiment according to FIG. 5 offers an additional advantageous possibility for further improvement in that, with a device of this kind, if the cover plate 4 and the foot plate 26 are designed in convex form (FIG. 6), possibilities are also given to make compensating adjustments with respect to alignment when deviations from the vertical occur. For this purpose, the drilled hole 27 through the cover plate 4 for the bolt 21 must be able to provide more room for play so that the whole assembly, up to a certain degree can be laterally adjusted. The locking connection between spindle 3 and foot plate 26, as can be seen, is retained.

Likewise included in the embodiments of FIGS. 5 and 6 is the support plate 1 with the screw socket 6 and also, in particular, the object-retaining ledge 2, in order to incorporate the feature of the device which prevents turning of the object with respect to the base. Depending on the shock-absorbing and load-supporting requirements, the solid base 5 and the metallic cover plate 4, which constitute the foundation of the device, need not necessarily be designed as separate parts but can also be combined into an integrally materially homogenous body, in other words, they may form a one-part foundation, in which case the shock-absorbing function, by way of example, can be provided by the resilient coating 1' of the support plate 1 alone and/or by the intermediate layer, if present, to the degree that they are made of materials able to absorb vibrations.

With a non-resilient one-part foundation, and when an intermediate plate 25 is added, effective braking buffers, or the like, must be provided to prevent rotary movements between these elements.

In the embodiment of FIG. 8, the threaded spindle is designed in the form of a double spindle with oppositely directed threads 7 and 8. Between the threads 7,8 there is placed an adjusting element 9 in the form of a collar 9', to which can be applied a wrench with a suitably sized opening in order to turn the spindle 3. In this way, depending on which direction the wrench is turned, the support plate 1 can be moved further away from, or brought closer to, the cover plate 4 of the solid base 5, since the threaded spindle 3 is likewise screwed into a correspondingly threaded socket on the cover plate 4. The screw socket on the support plate 1 and the cover plate 4 can be made by simply welding internally threaded sleeves to the respective plates. It is, however, advantageous to make the support plate 1 and the cover plate 4, as shown in FIGS. 9 and 10, in the form of drawn press-molded parts, in which annular collars 11 can be pressed out of the appropriately dimensioned metal blanks during the press-molding process. With a suitable thickness of the metal the internal threads can, of course, be cut directly into the annular collars 11. In order not to have to keep these annular collars 11, and therefore the metal blank as a whole, thick enough for this purpose, it is also possible to simply press-fit suitable nuts 12 into the press-molded parts, as shown in FIGS. 9 and 10. Likewise capable of being pressed out during the press-molding process for this embodiment is a rim 11', bent inwards, on the annular collar 11 of the cover plate 4 (FIG. 9). If necessary, the nut 12 in the cover plate 4 can, of course, also be solidly welded in so that this nut 12 cannot be forced downward through the plate when a load is applied, in the event that the load-supporting capacity of the press-fitted mounting for the nut 12 in the ring collar 11 should not be adequate.

The same principle may also be applied for the support plate 1 of FIG. 10. Since, in this case, the load force is directed upwards, a method of securing the nut using an inward-bent rim can not be provided, and so the nut in this case is secured simply by the use of one or more welded areas 11''.

In accordance with FIG. 11, the double spindle 3' is advantageously composed of a threaded bushing 10 which has an internal thread 8 and oppositely directed an external threading 7. The associated threads in the support plate 1 and the cover plate 4 are, of course, correspondingly directed. In this embodiment, the support plate 1 is provided with a threaded bolt 8' which can be screwed into the thread 8.

In the embodiment of FIG. 12, the parts can be made either as castings or as press-molded parts, depending on the load to be supported, while the threads are cut directly into the annular collar 11.

FIG. 13 illustrates a special embodiment in that the support plate 1 is provided with a skirt 13 extending downwards toward the cover plate 4 or the solid base 5 and over the edge 14 of the cover plate 4, correspondingly modified in shape, so as not to interfere with the adjusting procedure. The height H of skirt 13 is so dimensioned that when the plates 1 and 4 are set at the minimum distance apart, it cannot touch the bottom, a requirement which would not have to be taken into account if skirt 13 were attached to the cover plate 4 and extended upwards, skirting around the edge of the cover plate 1 (not illustrated). Aside from the visually attractive appearance of the device provided by such a skirt 13, given a corresponding shape modification for each of the two plates concerned, it has the advantage that the two plates 1 and 4 cannot turn in relation to each other even under the most adverse conditions since the plate without the skirt will be prevented from doing so by skirt 13 which is attached to the other plate. The adjustment principle between the solid base 5 and the support plate 1 provided with the ledge is also realized in the embodiment according to FIG. 14, intermediate member 15 is screwed onto the threaded spindle 3 that is in a locking connection with the cover plate 4. Member 15 defines a support plate seat 16, and the support plate 1 is rotatably mounted on that seating with a suitably matching skirt 17. As can be seen, this type of design illustrates a particularly simple embodiment. To ensure that the whole assembly cannot fall apart, skirt 17 is held on seat 16 by suitable clamps 18 fastened to intermediate member 15 which, in this case, itself forms the means of adjustment for the desired and required distance setting between the solid base 5 and the support plate 1. This also applies to the embodiment of FIG. 15.

In this embodiment, a separator piece 19 between the support and cover plates 1 and 4 is in a locking and rotatable connection with threaded spindle 3 which is joined in a locking connection with the cover plate 4. The cover plate 4 is made up of two separate plate parts 4' and 4'', and the threaded spindle 3 is connected fixedly or frictionally with the lower plate part 4'' so that, when the spacer 19 is turned, the plate part 4'' is pressed away from the plate part 4' and the device is readjusted by that means. In this embodiment, the support plate 1, the spacer 19, and the part 4'' are provided with suitable twisting guides 31, while the support plate 1, as is illustrated by way of example, is rotatably held on the spacer 19 by means of a fastener screw 18'. Fasteners 18'' attach rotatable adherence of the spacer 19 to the cover plate part 4' of cover plate 4 for rotation therewith.

I claim:

1. A vertically adjustable, shock-absorbing mounting device for supporting an object, which comprises
   (a) a foundation body including a metallic cover plate,
   (b) a support plate having an underside and a supporting surface for the object, the support plate including
      (1) a ledge protruding from the support surface at no more than two adjoining sides of the support plate for engaging and retaining the object on the supporting surface against rotation in relation thereto, and
   (c) a threaded spindle having an upper end connected with the underside of the support plate and a lower end connected with the cover plate, one of the spindle ends being in threaded connection and the other spindle end being in locking connection with the respective plate whereby rotation of the threaded spindle adjusts the spacing between the foundation and the support plate while the object is held against rotation by the retaining engagement with the ledge.

2. The mounting device of claim 1, further comprising a threaded socket on the underside of the support plate, the upper spindle end being in threaded connection with the threaded socket.

3. The mounting device of claim 1, wherein the threaded spindle has two sets of threads directed in opposite directions towards the upper and lower ends, respectively, and carries a polygonal adjustment element capable of being gripped by an adjusting means for rotating the spindle.

4. The mounting device of claim 3, wherein the threaded spindle has the form of a sleeve, one of the sets of threads being on the inside of the sleeve while the other set of threads is on the outside of the sleeve.

5. The mounting device of claim 1, wherein at least one of the plates is a press-molded sheet metal part having an annular collar receiving a respective one of the spindle ends.

6. The mounting device of claim 5, wherein the annular collar is a threaded socket in threaded connection with the respective spindle end.

7. The mounting device of claim 5, further comprising an internally threaded nut press-fitted in the annular collar and in threaded connection with the respective spindle end.

8. The mounting device of claim 1, further comprising a skirt extending from one of the plates towards the other plate and beyond the circumference thereof.

9. The mounting device of claim 1, wherein the lower end of the threaded spindle is in locking connection with the cover plate, further comprising an intermediate member mounted on the upper spindle end in threaded connection therewith, the intermediate member defining a seat, and a skirt depending from the underside of the support plate and rotatably mounting the support plate on the seat.

10. The mounting device of claim 9, further comprising clamping means on the intermediate member for holding the skirt on the seat.

11. The mounting device of claim 1, wherein the lower end of the threaded spindle is in locking connection with the cover plate, further comprising a spacer member between the cover and support plates, the spacer member being in threaded connection with the upper spindle end.

12. The mounting device of claim 11, wherein the cover plate is comprised of an upper and lower plate part, the lower spindle end freely passing through the upper plate part and being affixed to the lower plate part for locking connection thereto.

13. The mounting device of claim 11, further comprising means for fastening the spacer member to the upper plate part.

14. The mounting device of claim 11, further comprising means for fastening the cover plate to the spacer member.

* * * * *